(12) United States Patent
Sakamoto et al.

(10) Patent No.: US 11,112,563 B2
(45) Date of Patent: *Sep. 7, 2021

(54) OPTICAL MULTIPLEXING CIRCUIT

(71) Applicant: NIPPON TELEGRAPH AND TELEPHONE CORPORATION, Tokyo (JP)

(72) Inventors: Junji Sakamoto, Kanagawa-ken (JP); Kei Watanabe, Atsugi (JP); Toshikazu Hashimoto, Atsugi (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/845,523

(22) Filed: Apr. 10, 2020

(65) Prior Publication Data

US 2020/0241206 A1 Jul. 30, 2020

Related U.S. Application Data

(63) Continuation of application No. 16/077,940, filed as application No. PCT/JP2017/005975 on Feb. 17, 2017, now Pat. No. 10,649,144.

(30) Foreign Application Priority Data

Feb. 18, 2016 (JP) ................................ 2016-029361
Feb. 18, 2016 (JP) ................................ 2016-029366

(51) Int. Cl.
*G02B 6/293* (2006.01)
*G02B 6/12* (2006.01)
*G02B 6/14* (2006.01)

(52) U.S. Cl.
CPC ...... *G02B 6/29344* (2013.01); *G02B 6/12007* (2013.01); *G02B 6/2938* (2013.01); *G02B 6/14* (2013.01); *G02B 6/29332* (2013.01)

(58) Field of Classification Search
CPC .......... G02B 6/12; G02B 6/14; G02B 6/2938; G02B 6/29344
See application file for complete search history.

(56) References Cited

U.S. PATENT DOCUMENTS 7,539,373 B1   5/2009  Logvin et al.
8,704,447 B2   4/2014  Ide et al.
(Continued)

FOREIGN PATENT DOCUMENTS

CN   101504472 A   8/2009
CN   104749707 A   7/2015
(Continued)

OTHER PUBLICATIONS

International Search Report dated May 9, 2017, issued in PCT Application No. PCT/JP2017/005975 filed Feb. 17, 2017.
(Continued)

*Primary Examiner* — Daniel Petkovsek
(74) *Attorney, Agent, or Firm* — Workman Nydegger

(57) ABSTRACT

Provided is an optical multiplexing circuit. The waveguide width of each waveguide is set such that the effective refractive index of a first optical waveguide with a first light beam in the 0-th order mode is equal to the effective refractive index of a MM conversion waveguide with the first light beam in the higher order mode and that the effective refractive indexes of the MM conversion waveguide with second and third light beams in the higher order mode are not equal to the effective refractive indexes of a second optical waveguide with the second and third light beams in the 0-th order mode.

5 Claims, 11 Drawing Sheets

(56) References Cited

U.S. PATENT DOCUMENTS

| | | | |
|---|---|---|---|
| 9,306,670 B2* | 4/2016 | Fujiwara | G02B 6/2808 |
| 10,408,999 B2* | 9/2019 | Katsuyama | G02B 6/29388 |
| 10,649,144 B2* | 5/2020 | Sakamoto | G02B 6/12007 |
| 2009/0185811 A1 | 7/2009 | Cho et al. | |
| 2012/0068609 A1 | 3/2012 | Ide et al. | |
| 2013/0223791 A1 | 8/2013 | Okayama | |
| 2013/0315537 A1 | 11/2013 | Murao et al. | |
| 2014/0186040 A1 | 7/2014 | Fujiwara et al. | |

FOREIGN PATENT DOCUMENTS

| | | |
|---|---|---|
| CN | 104849803 A | 8/2015 |
| EP | 1344095 A2 | 9/2003 |
| JP | 2004093884 | 3/2004 |
| JP | 2006323319 | 11/2006 |
| JP | 2013174752 | 9/2013 |
| JP | 2014119556 | 6/2014 |
| WO | 2008/108422 | 9/2008 |
| WO | 2010/137661 | 12/2010 |
| WO | 2013/046696 | 4/2013 |

OTHER PUBLICATIONS

International Preliminary Report on Patentability dated Aug. 30, 2018, issued in PCT Application No. PCT/JP2017/005975 filed Feb. 17, 2017.

Akira Nakao et al., *Integrated Wageguide-Type Red-Green-Blue Beam Combiners for Compact Projection-Type Displays*, Optics Communications, vol. 330, 2014, pp. 45-48.

Apollo Inc., *APPS Apollo Application Note on Multi-Mode Interference (MMI) Devices*, [on line], Feb. 3, 2015, <URL:http://www.apollophoton.com/apollo/APNT/APN-APSS-MMI.pdf>., 26 pgs.

Extended European Search Report dated Oct. 21, 2019 in corresponding European Patent Application No. 17753330.4.

* cited by examiner

OPTICAL MULTIPLEXING CIRCUIT

This application is a continuation of U.S. Ser. No. 16/077,940, now U.S. Pat. No. 10,649,144, filed Aug. 14, 2018, which is a 371 of International Application PCT/JP2007/005975 filed Feb. 17, 2017.

TECHNICAL FIELD

The present invention relates to an optical multiplexing circuit and more specifically relates to, for example, a three-primary-color optical multiplexing circuit that multiplexes visible light beams having three primary colors, namely, R, G, and B light beams (R: red light, G: green light, B: blue light).

BACKGROUND ART

In recent years, an RGB coupler module using a silica-based planar lightwave circuit (PLC) has been drawing attention as a circuit element that multiplexes visible light beams of three primary colors for eyeglass-type devices and projectors (see Non Patent Literature 1, for example). In the PLC, optical waveguides are created in a planar substrate by patterning and etching processes in photolithography or the like and a plurality of basic optical circuits (e.g. directional couplers, Mach-Zehnder interferometers, etc.) are combined with each other to implement various functions.

There is a three-primary-color multiplexing circuit that utilizes, for example, directional couplers and/or Mach-Zehnder interferometers (see Non Patent Literature 1). In this description, the simplest case of using directional couplers will be described by taking FIG. 1 as an example.

FIG. 1 illustrates the basic structure of an RGB coupler module using a PLC. As illustrated in FIG. 1, the basic structure of the RGB coupler module using a PLC is formed of three optical waveguides, which are first to third optical waveguides 1 to 3. A first directional coupler 4 is coupled to the first optical waveguide 1. An output waveguide 5 is coupled to the second optical waveguide 2. A second directional coupler 6 is coupled to the third optical waveguide 3. The waveguide length, waveguide width, and inter-waveguide gap of the first directional coupler 4 are designed such that the first directional coupler 4 couples a light beam with a wavelength λ1 from the first optical waveguide 1 to the second optical waveguide 2, and couples a light beam with a wavelength λ2 from the second optical waveguide 2 to the first optical waveguide 1 and from the first optical waveguide 1 to the second optical waveguide 2. The waveguide length, waveguide width, and inter-waveguide gap of the second directional coupler 6 are designed such that the second directional coupler 6 couples a light beam with a wavelength λ3 from the third optical waveguide 3 to the second optical waveguide 2 and transmits the light beams with the wavelength λ1 and the wavelength λ2.

In one example where λ1<λ2<λ3, a blue light beam (wavelength λ1) is input to the first optical waveguide 1, a green light beam (wavelength λ2) is input to the second optical waveguide 2, and a red light beam (wavelength λ3) is input to the third optical waveguide 3, for example. The light beams of the three colors are multiplexed through the first directional coupler 4 and the second directional coupler 6 and output from the output waveguide 5. Unlike an optical multiplexing circuit for communication with a small bandwidth ratio, a three-primary-color optical multiplexing circuit deals with the wavelength of the blue light beam (wavelength band 400 nm) and the wavelength of the red light beam (wavelength band 700 nm), which greatly differ from each other. Accordingly, the wavelength dependency of the coupling length is significant. This makes it possible to make a configuration as above.

Also, as discussed in Non Patent Literature 2, light beams with different wavelengths can be multiplexed also by using a multi-mode interference (MMI) waveguide. However, since each of the number of input waveguides and the number of output waveguides is two, it is difficult to multiplex light beams with three or more wavelengths by using MMI.

A directional coupler will be briefly described below for the understanding of the embodiments of the present invention to be described later. FIG. 2 illustrates the basic principle of a directional coupler. FIG. 2 illustrates two waveguides 11 and 12. As illustrated in FIG. 2, the directional coupler is a coupler that transfers a light beam passing through one of the waveguides, or the waveguide 11, to the opposite waveguide 12 in a state where the two waveguides 11 and 12 are arranged close to each other.

Let a z axis be set along the light travel direction. Then, in a case where a light beam with a light intensity of 1 is input to the waveguide 11, the light intensity of the light beams propagating through the waveguide 11 and the waveguide 12 is $P1(z)$ and $P2(z)$ at a position Z, respectively. $q = \kappa^2 + \delta^2$, $F = 1/(1+(\delta/\kappa)2)$, and $\delta = (\beta2 - \beta1)/2$ are given, where $\kappa$ is the mode coupling constant, and $\beta1$ and $\beta2$ are the propagation constants of the waveguide 11 and the waveguide 12, respectively. $P1(z)$ and $P2(z)$ are expressed by (equation 1) and (equation 2) below, respectively.

$$P_1(z) = 1 - F\sin^2(qz) \quad \text{(Equation 1)}$$

$$P_2(z) = F\sin^2(qz) \quad \text{(Equation 2)}$$

Here, the ratio of transfer of the light beam from the waveguide 11 to the waveguide 12 is greatest when $z = \pi/2q \cdot (2m+1)$, where m=0, 1, 2, .... The distance when m=0 is called the coupling length. Also, when $\delta=0$, the light transfer ratio is 100%.

CITATION LIST

Non Patent Literatures

NPL 1: A. Nakao, R. Morimoto, Y. Kato, Y. Kakinoki, K. Ogawa and T. Katsuyama, "Integrated waveguide-type red-green-blue beam combiners for compact projection-type displays", Optics Communications 330 (2014) 45-48

NPL 2: Apollo Inc., "APSS Apollo Application Note on Multi-Mode Interference (MMI) Devices", [online], [searched on Feb. 3, 2016], the Internet <URL: http://www.apollophoton.com/apollo/APNT/APN-APSS-MMI.pdf>

SUMMARY OF INVENTION

Technical Problems

For a conventional optical multiplexing circuit as illustrated in FIG. 1, the waveguides need to be designed to satisfy conditions for coupling the blue light beam with the wavelength λ1 propagating through the first optical waveguide 1 to the second optical waveguide 2 at the first directional coupler 4 to couple it to the green light beam with the wavelength λ2 propagating through the second optical waveguide 2. The waveguides also need to be designed to satisfy conditions for transmitting the light beams with the wavelengths λ1 and λ2 coupled at the second optical waveguide 2 at the second directional coupler 6 and coupling the red light beam with the wavelength λ3 propagating through the third optical waveguide 3 to the second optical waveguide 2 at the second directional coupler 6. In that case, a waveguide design is needed that satisfies conditions for matching between the light beam with the wavelength λ2 propagating through the second optical waveguide 2 and the light beams with the wavelengths λ1 and λ3 propagating through the first and third optical waveguides 1 and 3, respectively.

For example, in a case of only transferring the red light beam with the wavelength λ3 to the second optical waveguide 2 at the second directional coupler 6, the red light beam can be transferred with a short waveguide length by narrowing the inter-waveguide gap to a certain extent. With the inter-waveguide gap thus reduced, however, the blue light with the wavelength λ1 and the green light with the wavelength λ2 are not transmitted at the second directional coupler 6 but transferred to the third optical waveguide 3. This increases the optical loss.

To avoid the coupling of the blue light with the wavelength λ1 and the green light with the wavelength λ2 to the third optical waveguide 3 to prevent the increase in optical loss, the inter-waveguide gap needs to be large and the coupler length needs to be long. Doing so, however, leads to a problem that the waveguide length cannot be shortened and the optical multiplexing circuit cannot therefore be downsized.

FIG. 3 illustrates a transmission spectrum calculated via a simulation by the beam propagation method (BPM) for specific numerical values of the second directional coupler 6 illustrated in FIG. 1. In FIG. 3, the waveguide length is set to 3700 μm, the waveguide width is set to 1.5 μm, the waveguide thickness is set to 3.6 μm, the inter-waveguide gap is set to 4.8 μm, a relative refractive index difference Δ between the core and the cladding is set to 0.45%, λ1 is set to 450 nm (blue), λ2 is set to 520 nm (green), and λ3 is set to 650 nm (red). As illustrated in FIG. 3, the second directional coupler 6 transmits 99.6% of the light beam with the wavelength λ1, transmits 93.0% of the light beam with the wavelength λ2, and couples 95.5% of the light beam with the wavelength λ3 to the second optical waveguide 2. With the inter-waveguide gap narrowed, the light beams with the wavelengths λ1 and λ2 are coupled to the third optical waveguide 3, thereby lowering the transmission rate. Hence, it is difficult to shorten the directional coupler length any further without deteriorating the characteristics.

Also, in a conventional optical multiplexing circuit as illustrated in FIG. 1, an input waveguide and a directional coupler may be added to add another light beam in an attempt to raise the intensity of the exiting light beam. However, the light beams originally multiplexed in the optical multiplexing circuit before the addition exit from the added input waveguide and/or directional coupler. This makes it impossible to raise the intensity of the exiting light beam. Thus, there has been a problem that it is impossible to emit a light beam with a light intensity equal to or greater than that of the laser's performance.

The present invention has been made in view of the above problems, and an object thereof is to make an optical multiplexing circuit that is small and multiplexes a plurality of light beams with a plurality of wavelengths with a low loss, and also to make an optical multiplexing circuit that can output a multiplexed light beam with higher intensity and a smaller spot diameter when multiplexing a plurality of light beams with a plurality of wavelengths using a planar lightwave circuit.

Solution to Problems

To solve the above problems, an optical multiplexing circuit according to an embodiment of the present invention including: a first optical waveguide inputting a first light beam with a first wavelength in a 0-th order mode; a second optical waveguide inputting second and third light beams with second and third wavelengths in the 0-th order mode, the second and third wavelengths being different from the first wavelength and different from each other; a multi-mode conversion waveguide provided between the first optical waveguide and the second optical waveguide; a first coupling part converting a waveguide mode of the first light beam propagating through the first optical waveguide into a higher order mode to couple the first light beam converted into the higher order mode to the multi-mode conversion waveguide; and a second coupling part converting a waveguide mode of the first light beam propagating through the multi-mode conversion waveguide into the 0-th order mode to couple the first light beam converted into the 0-th order mode to the second optical waveguide to transmit the second and third light beams, wherein the second optical waveguide multiplexes the first light beam converted into the 0-th order mode and coupled by the second coupling part and the second and third light beams transmitted by the second coupling part to output the first light beam and the second and third light beams as a multiplexed light beam, and waveguide widths of the first optical waveguide, the second optical waveguide, and the multi-mode conversion waveguide are set such that an effective refractive index of the first optical waveguide with the first light beam in the 0-th order mode is equal to an effective refractive index of the multi-mode conversion waveguide with the first light beam in the higher order mode and that effective refractive indexes of the multi-mode conversion waveguide with the second and third light beams in the higher order mode are not equal to effective refractive indexes of the second optical waveguide with the second and third light beams in the 0-th order mode.

Also, an optical multiplexing circuit according to another embodiment of the present invention is an optical multiplexing circuit that uses a planar lightwave circuit and outputs a multiplexed light beam, including: a first optical waveguide inputting a first light beam with a first wavelength in a 0-th order mode; a multiplexing optical waveguide inputting one or more other light beams with one or more wavelengths in the 0-th order mode, the one or more wavelengths being different from the first wavelength and different from each other; and a first multiplexing part converting a waveguide mode of the first light beam propagating through the first optical waveguide into a higher order mode to couple the converted first light beam to the multiplexing optical waveguide to thereby multiplex the coupled first light beam with the one or more other light beams propagating through the multiplexing optical waveguide, wherein the multiplexing optical waveguide includes a first portion arranged close to the first multiplexing part, and the waveguide widths of the first optical waveguide and the first portion are set such that an effective refractive index of the first optical waveguide with the first light beam in the 0-th order mode is equal to an effective refractive index of the first portion of the multiplexing optical waveguide with the first light beam in the higher order mode and that effective refractive indexes of the first portion of the multiplexing optical waveguide with the one or more other light beams in the higher order mode are not equal to effective refractive indexes of the first optical waveguide with the one or more other light beams in the 0-th order mode.

Advantageous Effects of Invention

According to the present invention, even in the case of multiplexing a plurality of light beams with a plurality of wavelengths using a PLC, if conditions for coupling the light beams with desired wavelengths are satisfied, it is possible to suppress coupling of the light beams with the other wavelengths and couple and multiplex only the light beams with the desired wavelengths. Then, the gap at each directional coupler can be narrowed within the fabrication capability, and accordingly the coupling length can be shortened. It is therefore possible to make an efficient and small optical multiplexing circuit.

Moreover, according to the present invention, the intensity of existing light from an RGB multiplexing circuit using a planar lightwave circuit by be raised by using a space multiplexing technique.

DESCRIPTION OF EMBODIMENTS

Embodiment 1

An optical multiplexing circuit according to embodiment 1 of the present invention will be specifically described with reference to FIGS. 4 to 6. In this embodiment, light beams with wavelengths $\lambda 1$, $\lambda 2$, and $\lambda 3$ are light beams with wavelengths in blue (400 to 495 nm), green (495 to 570 nm), and red (620 to 750 nm) wavelength bands, respectively.

Figure 4:
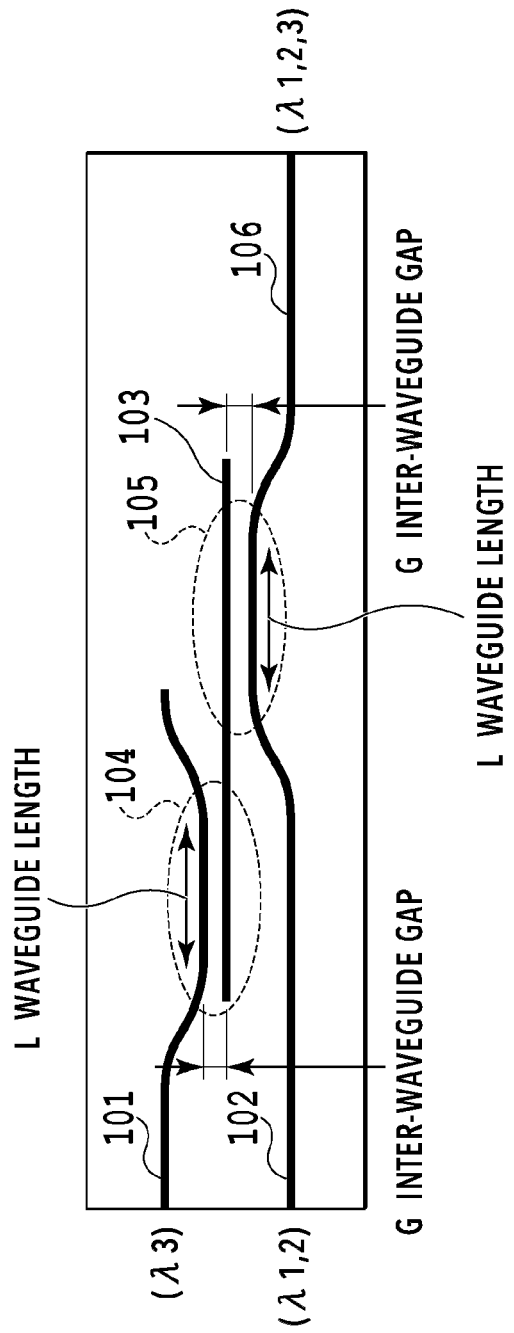
FIG. 4 exemplarily illustrates an optical multiplexing circuit according to embodiment 1 of the present invention.

FIG. 4 exemplarily illustrates the optical multiplexing circuit according to embodiment 1 of the present invention. FIG. 4 illustrates an optical multiplexing circuit including a first optical waveguide 101 in which the light beam with the wavelength $\lambda 3$ is input, a second optical waveguide 102 in which the light beams with the wavelengths $\lambda 1$ and $\lambda 2$ are input, a multi-mode (MM) conversion waveguide 103, a first coupling part 104, a second coupling part 105, and an output waveguide 106 coupled to the second optical waveguide 102. Here, in this embodiment 1, description will be given of an example where the two light beams with the wavelengths $\lambda 1$ and $\lambda 2$ are input into the second optical waveguide 102. However, the configuration is not limited to this but may be such that only one of the light beams is input into the second optical waveguide 102.

The first and second optical waveguides 101 and 102 and the MM conversion waveguide 103 are formed of a lower cladding layer provided on a substrate, a core layer higher in refractive index than the lower cladding layer, and an upper cladding layer provided on the core layer. The upper cladding layer is provided so as to surround the core layer. The first and second optical waveguides 101 and 102 can be single-mode waveguides. As illustrated in FIG. 4, the first optical waveguide 101, the second optical waveguide 102, and the MM conversion waveguide 103 are arranged side by side along the light travel direction.

In this embodiment 1, the first and second optical waveguides 101 and 102 and the MM conversion waveguide 103 differ from each other in waveguide width. The first coupling part 104 is a directional coupler formed by arranging the first optical waveguide 101 and the MM conversion waveguide 103 close to each other. The second coupling part 105 is a directional coupler formed by arranging the second optical waveguide 102 and the MM conversion waveguide 103 close to each other.

In the optical multiplexing circuit according to this embodiment 1, the MM conversion waveguide 103 is provided between the first and second optical waveguides 101 and 102. Thus, the light beam with the wavelength $\lambda 3$ having input to the first optical waveguide 101 undergoes waveguide mode conversion into a higher order mode (e.g. first order mode) and transfers to the MM conversion waveguide 103 at the first coupling part 104. The light beam with the wavelength $\lambda 3$ having transferred to the MM conversion waveguide 103 further undergoes waveguide mode conversion into the fundamental mode (0-th order mode) and transfers to the second optical waveguide 102 at the second coupling part 105.

The two light beams with the wavelengths $\lambda 1$ and $\lambda 2$ in the 0-th order mode having input to the second optical waveguide 102 do not transfer to the MM conversion waveguide 103 at the second coupling part 105 but are transmitted by the second coupling part 105 since, as described later, the second coupling part 105 is designed not to satisfy conditions for coupling them to the MM conversion waveguide 103. As a result, the light beams with the wavelengths $\lambda 1$ and $\lambda 2$ transmitted by the second coupling part 105 and the light beam with the wavelength $\lambda 3$ having transferred from the first optical waveguide 101 through the MM conversion waveguide 103 are multiplexed. The multiplexed light beam is output from the output waveguide 106.

Figure 1:
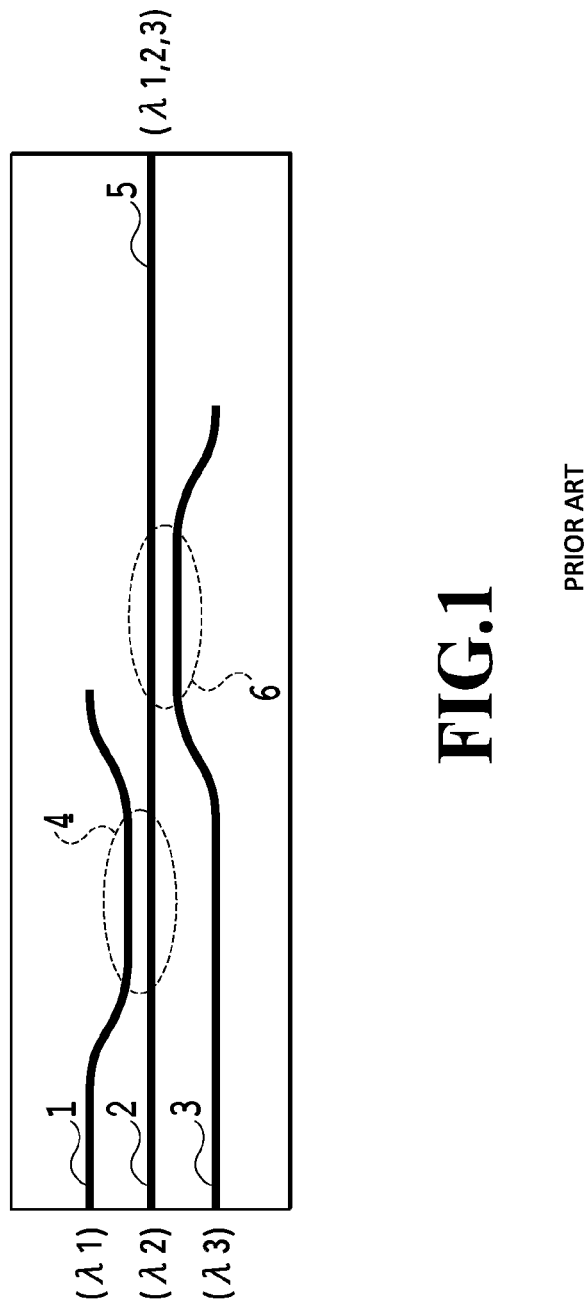
FIG. 1 illustrates the basic structure of an RGB coupler module using a PLC.
Figure 2:
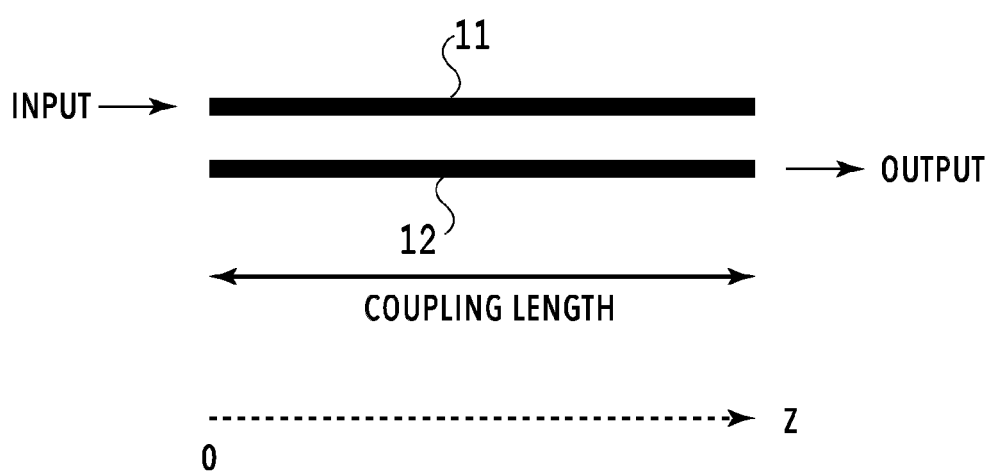
FIG. 2 illustrates the configuration of a directional coupler.
Figure 3:
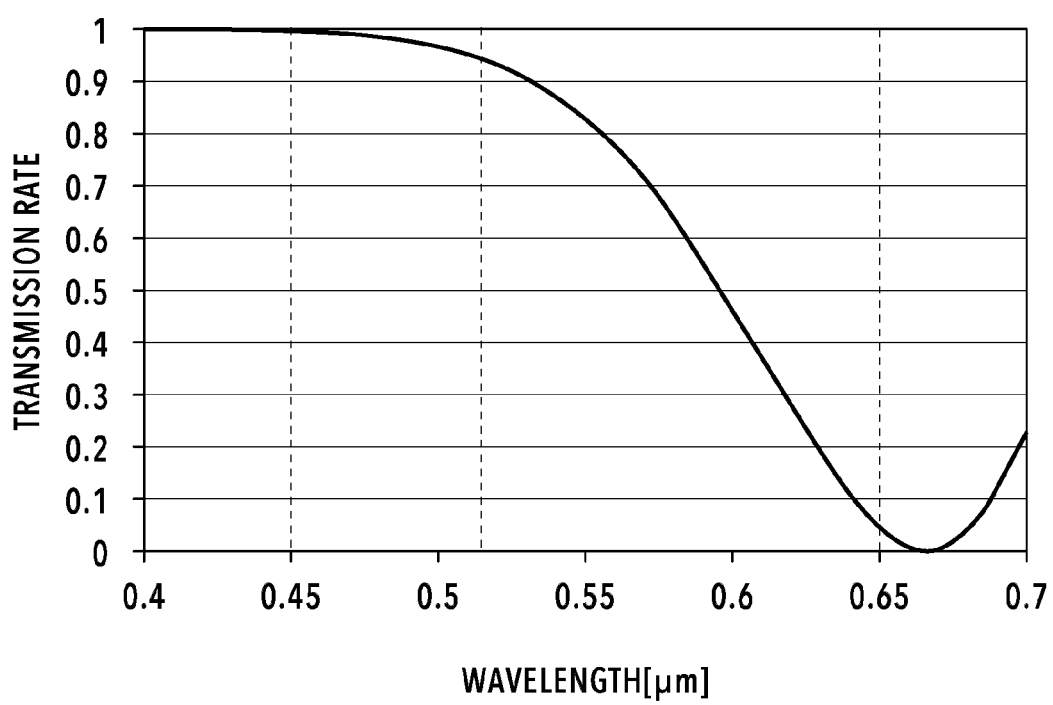
FIG. 3 illustrates a transmission spectrum calculated via a simulation by BPM on the second directional coupler 6 illustrated in FIG. 1.
Figure 5:
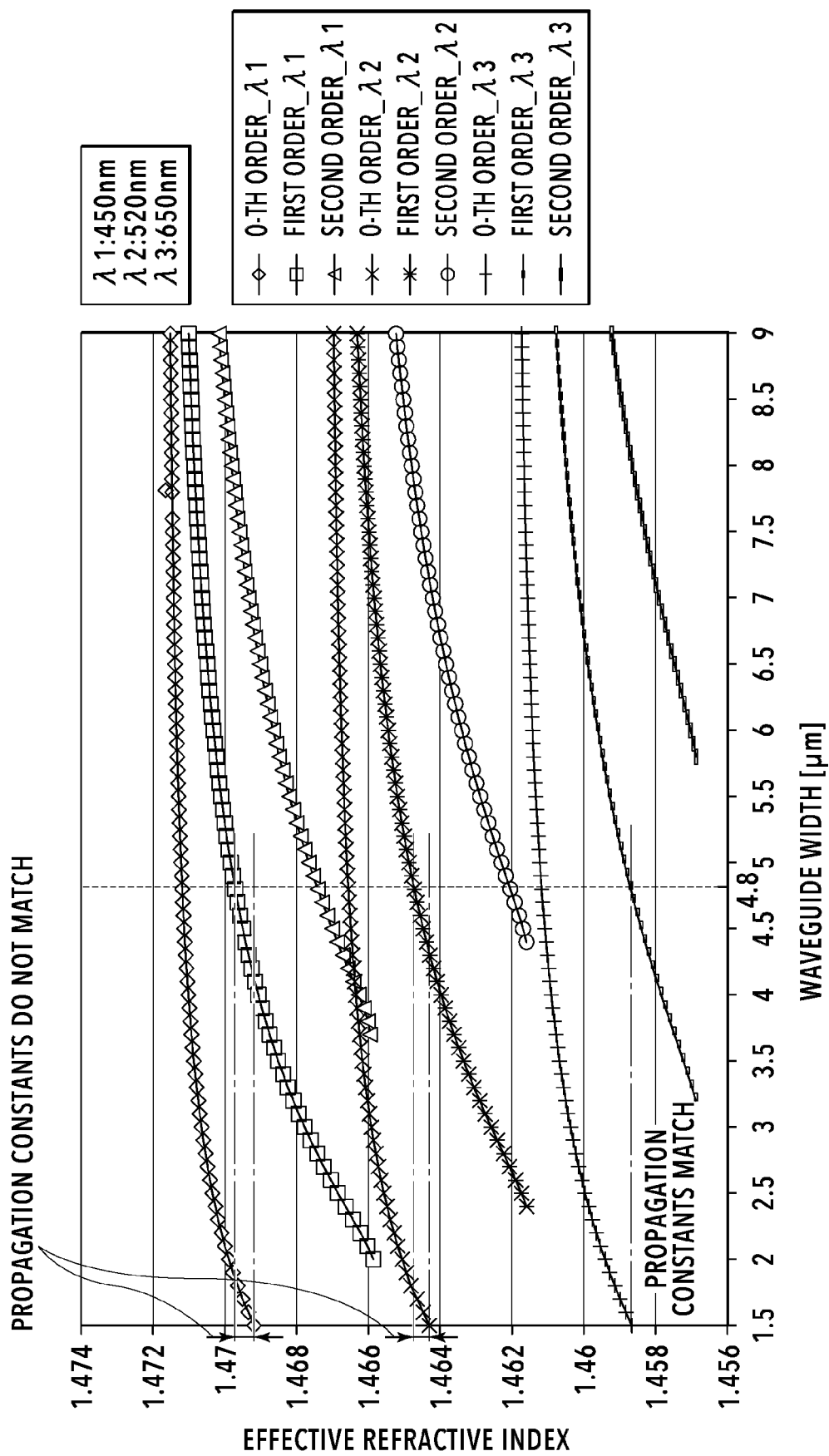
FIG. 5 illustrates the relation between the effective refractive index and the waveguide width for each of given wavelengths in each of the 0-th, first, and second orders in an optical multiplexing circuit according to the present invention.

FIG. 5 illustrates the relation between the effective refractive index and the waveguide width for each of the light beams with the wavelengths $\lambda 1$, $\lambda 2$, and $\lambda 3$ in each of the 0-th, first, and second order modes in the optical multiplexing circuit according to this embodiment 1 in a case where λ1=450 nm, λ2=520 nm, and λ3=650 nm. In FIG. 5, the waveguide thickness is 3.6 μm and the relative refractive index difference Δ is 0.45%, which are the same conditions as those used in FIG. 3.

The waveguide widths of the first and second optical waveguides 101 and 102 are 1.5 μm, and the waveguide width of the MM conversion waveguide 103 is 4.8 μm. In this case, as illustrated in FIG. 5, the effective refractive indexes of the light beam with the wavelength λ3 in the 0-th order mode and the first order mode substantially coincide with each other. This indicates that the light beam transfers between the first optical waveguide 101 and the MM conversion waveguide 103 based on (equation 2). Thus, the light beam with the wavelength λ3 propagating through the first optical waveguide 101 is converted into a first order mode light beam and coupled to the MM conversion waveguide 103 at the first coupling part 104 and is converted into a 0-th order light beam and coupled to the second optical waveguide 102 at the second coupling part 105.

On the other hand, as illustrated in FIG. 5, with the above waveguide widths, neither of the effective refractive indexes of the light beams with the wavelengths λ1 and λ2 traveling through the second optical waveguide 102 coincides with the effective refractive indexes of the light beams in any waveguide modes. Thus, the light beams with the wavelengths λ1 and λ2 are hardly coupled to the MM conversion waveguide 103. Hence, the second coupling part 105 can be designed by considering only the conditions for the coupling of the light beam with the wavelength λ3. Specifically, the waveguide widths of the first and second optical waveguides 101 and 102 and the waveguide width of the MM conversion waveguide 103 may just need to be designed such that the effective refractive index of the first optical waveguide 101 with the light beam with the wavelength λ3 in the 0-th order mode is equal to the effective refractive index of the MM conversion waveguide 103 with the light beam with the wavelength λ3 in the higher order mode and that the effective refractive index of the second optical waveguide 102 with each of the light beams with the wavelengths λ1 and λ2 in the 0-th order mode is not equal to the effective refractive index of the MM conversion waveguide 103 with each of the light beams with the wavelengths λ1 and λ2 in the higher order mode.

Figure 6:
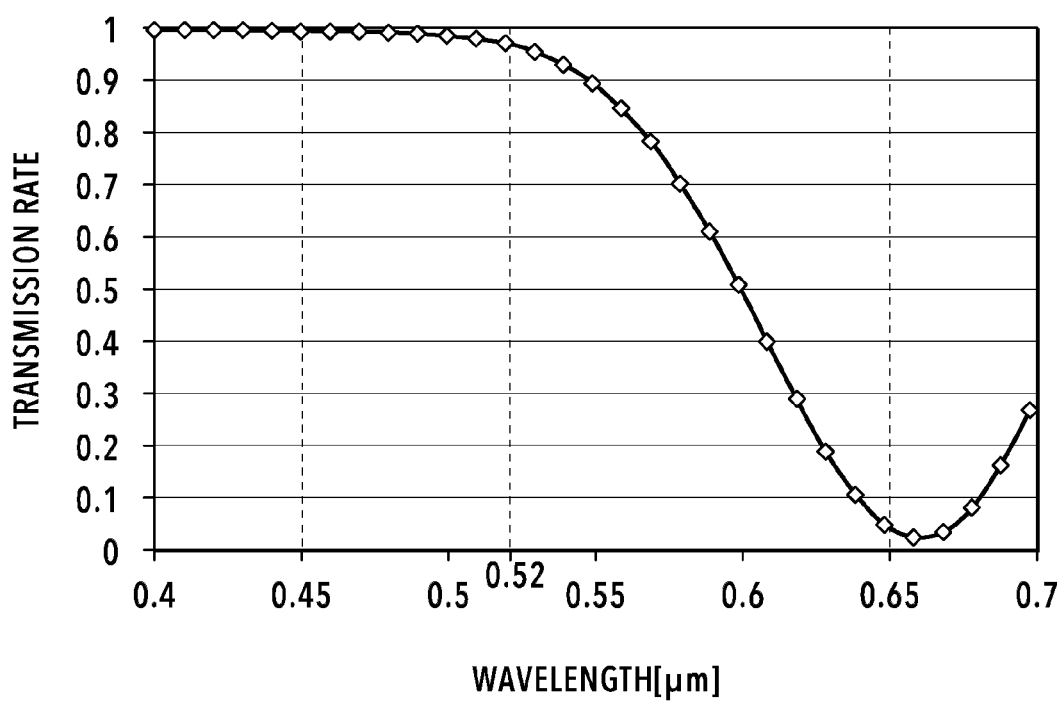
FIG. 6 illustrates a transmission spectrum in the optical multiplexing circuit according to the present invention.

FIG. 6 illustrates a transmission spectrum in a case where, for example, the waveguide thickness is 3.6 μm, the relative refractive index difference Δ is 0.45%, and inter-waveguide gaps G and waveguide lengths L illustrated in FIG. 4 are 2.5 μm and 702 μm, respectively. As illustrated in FIG. 6, at the second coupling part 105, 99.5% of the light beam with the wavelength λ1 can be transmitted, 97.2% of the light beam with the wavelength λ2 can be transmitted, and 95.0% of the light beam with the wavelength λ3 can be coupled. Accordingly, with the optical multiplexing circuit according to this embodiment 1, it is possible to shorten the waveguide length to approximately ⅕ of the waveguide length in a conventional configuration without deteriorating the characteristics.

Figure 7:
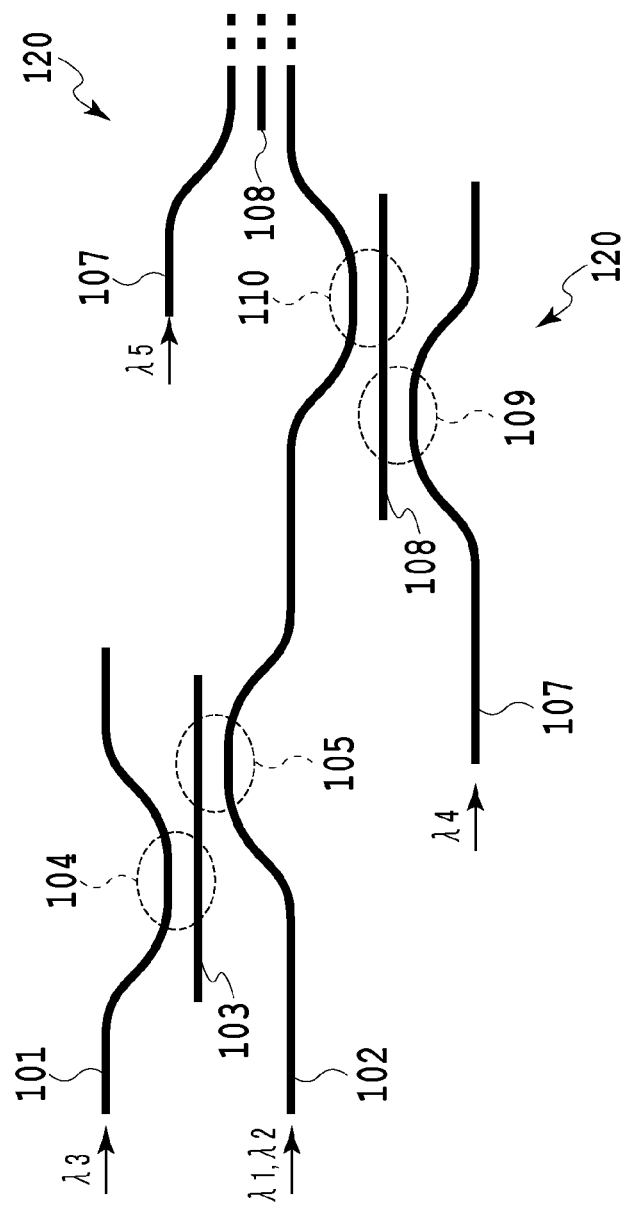
FIG. 7 illustrates another example of the optical multiplexing circuit according to this embodiment 1.

Although the description has been given of the example in which three light beams are multiplexed in this embodiment, the optical multiplexing circuit according to this embodiment 1 is also applicable to cases of multiplexing four or more light beams with four or more wavelengths. FIG. 7 illustrates another example of the optical multiplexing circuit according to this embodiment 1 for the cases of multiplexing four or more light beams with mutually different wavelengths. The optical multiplexing circuit illustrated in FIG. 7 includes the first optical waveguide 101, the second optical waveguide 102, the MM conversion waveguide 103, the first coupling part 104, and the second coupling part 105 and further includes one or more optical circuits 120 each including a third optical waveguide 107, a second MM conversion waveguide 108, and third and fourth coupling parts 109 and 110. The one or more optical circuits 120 are arranged at a plurality of stages along the light travel direction. The third optical waveguides 107 of the one or more optical circuits 120 receive light beams with wavelengths different from the wavelengths λ1 to λ3 and different from each other.

In this example, the waveguide widths of the third optical waveguide 107 and the second MM conversion waveguide 108 in each of the one or more optical circuits 120 are set such that the effective refractive index of the third optical waveguide 107 with an input light beam in the 0-th order mode is equal to the effective refractive index of the second MM conversion waveguide 108 with this input light beam in a higher order mode and that the effective refractive indexes of the second MM conversion waveguide 108 with the multiplexed light beam in the higher order mode inputting the fourth coupling part 110 are not equal to the effective refractive indexes of the second optical waveguide 102 with the multiplexed light beam in the 0-th order mode inputting the fourth coupling part 110.

Thus, in this example, at the above stages with the optical circuits 120, light beams with mutually different wavelengths in the 0-th order mode having input to the respective third optical waveguides 107 can be converted into multimode light beams and transfer to the respective second MM conversion waveguides 108 at the respective third coupling parts 109, and be further converted into the fundamental mode and transfer to the second optical waveguide 102 at the respective fourth coupling parts 110. Then, the light beams having transferred to the fourth coupling parts 110 are each multiplexed at the second optical waveguide 102. Hence, four or more light beams can be output from the output waveguide 106.

Note that the waveguide widths and refractive indexes of the first and second optical waveguides 101 and 102 and the MM conversion waveguide 103 are comparative. Thus, the waveguide widths of the first and second optical waveguides 101 and 102 may be adjusted such that the propagation constants of the light beams in the 0-th order mode with the waveguide widths of the first and second optical waveguides 101 and 102 are equal to the propagation constant of the light beam in the higher order mode with the waveguide width of the MM conversion waveguide 103.

Embodiment 2

Figure 8:
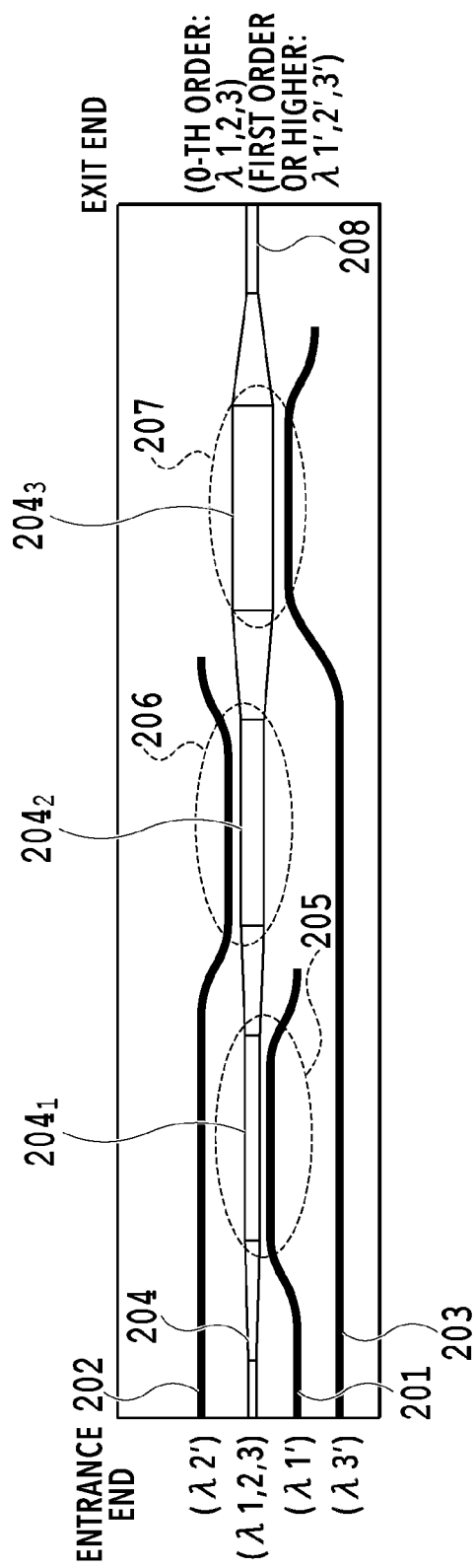
FIG. 8 exemplarily illustrates an optical multiplexing circuit according to embodiment 2 of the present invention.

An optical multiplexing circuit according to embodiment 2 of the present invention will be specifically described with reference to FIGS. 8 to 10. FIG. 8 is a diagram exemplarily illustrating the optical multiplexing circuit according to the embodiment of the present invention. FIG. 8 illustrates an optical multiplexing circuit including first to third waveguides 201 to 203, a multiplexing optical waveguide 204, first to third multiplexing parts 205 to 207, and an output waveguide 208 coupled to the multiplexing optical waveguide 204.

The first to third optical waveguide 201 to 203 and the multiplexing optical waveguide 204 are formed of a lower cladding layer provided on a substrate, a core layer higher in refractive index than the lower cladding layer, and an upper cladding layer provided on the core layer. The upper cladding layer is provided so as to surround the core layer. The first to third optical waveguides 201 to 203 can be single-mode waveguides. The multiplexing optical waveguide 204 can be a multi-mode waveguide. In this embodiment 2, the first to third multiplexing parts 205 to 207 are directional couplers formed by arranging the first to third optical waveguides 201 to 203 and the multiplexing optical waveguide 204 close to each other, respectively.

Moreover, as illustrated in FIG. 8, the multiplexing optical waveguide 204 includes first to third portions 2041 to 2043 differing from each other in waveguide width. The first to third portions 2041 to 2043 and the output waveguide 208 are each coupled to another by a tapered waveguide.

Figure 9:
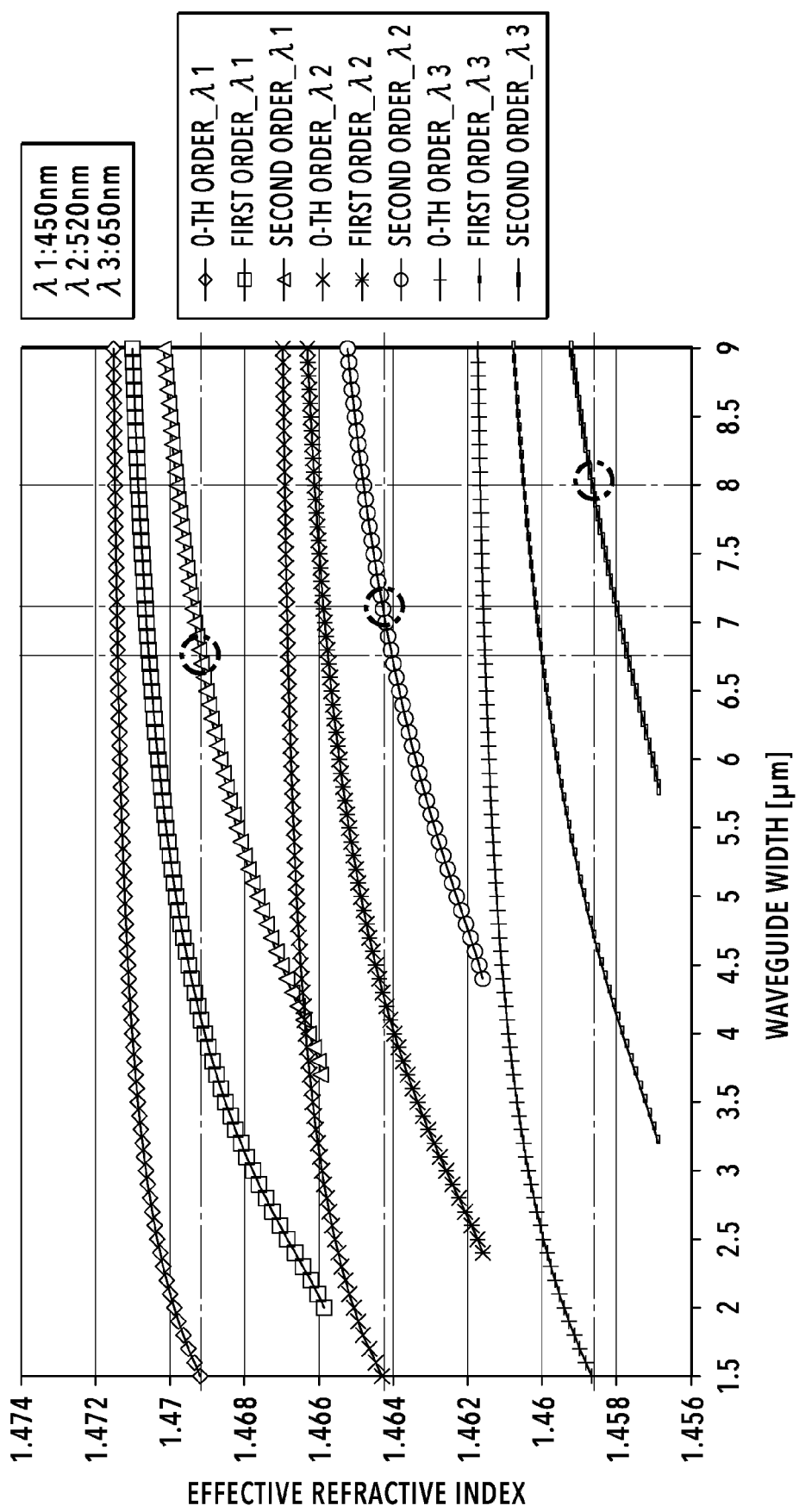
FIG. 9 illustrates the relation between the effective refractive index and the waveguide width for each of light beams with given wavelengths in each of the 0-th, first, and second orders in the optical multiplexing circuit according to embodiment 2 of the present invention.

In this embodiment 2, a method of multiplexing light beams with wavelengths $\lambda 1'$, $\lambda 2'$, and $\lambda 3'$ in the second order mode in the multiplexing optical waveguide 204, through which light beams with wavelengths $\lambda 1$, $\lambda 2$, and $\lambda 3$ in the 0-th order mode are propagating, will be specifically described using FIG. 9. This embodiment 2 assumes that $\lambda 1$=450 nm (blue), $\lambda 2$=520 nm (green), $\lambda 3$=650 nm (red), $\lambda 1'$=(450+$\alpha$) nm (blue), $\lambda 2'$=(520+$\beta$) nm (green), and $\lambda 3'$= (650+$\gamma$) nm (red) and that $\alpha$, $\beta$, and $\gamma$ are small values larger than 0 and smaller than the linewidth. The linewidth is dependent on the light source of the incoming light beam but is assumed to be about 1 nm or smaller.

In the optical multiplexing circuit according to this embodiment 2, the waveguide widths of the first optical waveguide 201 and the first portion 2041 are set such that the effective refractive index of the first optical waveguide 201 with the light beam with the wavelength $\lambda 1'$ in the 0-th order mode is equal to the effective refractive index of the first portion 2041 of the multiplexing optical waveguide 204 with the light beam with the wavelength $\lambda 1'$ in a higher order mode and that the effective refractive indexes of the first portion 2041 of the multiplexing optical waveguide 204 with the light beams with the wavelengths $\lambda 1$, $\lambda 2$, and $\lambda 3$ in the higher order mode are not equal to the effective refractive indexes of the first optical waveguide 201 with the light beams with the wavelengths $\lambda 1$, $\lambda 2$, and $\lambda 3$ in the 0-th order mode.

Also, the waveguide widths of the second optical waveguide 202 and the second portion 2042 are set such that the effective refractive index of the second optical waveguide 202 with the light beam with the wavelength $\lambda 2'$ in the 0-th order mode is equal to the effective refractive index of the second portion 2042 of the multiplexing optical waveguide 204 with the light beam with the wavelength $\lambda 2'$ in the higher order mode and that the effective refractive indexes of the second portion 2042 of the multiplexing optical waveguide 204 with the light beams with the wavelengths $\lambda 1$, $\lambda 2$, and $\lambda 3$ in the higher order mode are not equal to the effective refractive indexes of the second optical waveguide 202 with the light beams with the wavelengths $\lambda 1$, $\lambda 2$, and $\lambda 3$ in the 0-th order mode.

Further, the waveguide widths of the third optical waveguide 203 and the third portion 2043 are set such that the effective refractive index of the third optical waveguide 203 with the light beam with the wavelength $\lambda 3'$ in the 0-th order mode is equal to the effective refractive index of the third portion 2042 of the multiplexing optical waveguide 204 with the light beam with the wavelength $\lambda 3'$ in the higher order mode and that the effective refractive indexes of the third portion 2043 of the multiplexing optical waveguide 204 with the light beams with the wavelengths $\lambda 1$, $\lambda 2$, and $\lambda 3$ in the higher order mode are not equal to the effective refractive indexes of the third optical waveguide 203 with the light beams with the wavelengths $\lambda 1$, $\lambda 2$, and $\lambda 3$ in the 0-th order mode.

FIG. 9 illustrates the relation between the effective refractive index and the waveguide width for each of the light beams with the wavelengths $\lambda 1$, $\lambda 2$, and $\lambda 3$ in the 0-th, first, and second order modes in the optical multiplexing circuit according to this embodiment 2. The waveguide thickness is 3.6 µm, and the relative refractive index difference $\Delta$ is 0.45%.

As illustrated in FIG. 9, in a case where the waveguide widths of the first to third optical waveguides 201 to 203 are, for example, 1.5 µm (the left end of FIG. 9), the waveguide width with which the effective refractive index of the light beam with the wavelength $\lambda 1'$ in the second order mode is equal to the effective refractive index of the light beam with the wavelength $\lambda 1'$ in the 0-th order mode is 6.75 µm. Thus, the waveguide width of the first portion 2041 of the multiplexing optical waveguide 204, which is arranged close to the first multiplexing part 205, is set to 6.75 µm so that the light beam with the wavelength $\lambda 1'$ in the 0-th order mode propagating through the first optical waveguide 201 can transfer to the first portion 2041 of the multiplexing optical waveguide 204.

With this setting, the light beam with the wavelength $\lambda 1'$ in the 0-th order mode propagating through the first optical waveguide 201 undergoes waveguide mode conversion into the second order mode and is coupled to the multiplexing optical waveguide 204 at the first multiplexing part 205. The coupled light beam with the wavelength $\lambda 1'$ in the second order mode is multiplexed with the light beams with the wavelengths $\lambda 1$, $\lambda 2$, $\lambda 3$ in the 0-th order mode propagating through the multiplexing optical waveguide 204. If the inter-waveguide gap is 2.2 µm, the coupling length is 3280 µm. Also, as illustrated in FIG. 9, the light beams with the wavelengths $\lambda 1$, $\lambda 2$, and $\lambda 3$ in the 0-th order mode propagating through the multiplexing optical waveguide 204 are hardly coupled to the first optical waveguide 201 since their effective refractive indexes are greatly different.

Next, the light beam with the wavelength $\lambda 2'$ in the 0-th order mode propagating through the second optical waveguide 202 undergoes waveguide mode conversion into the second order mode and is coupled to the multiplexing optical waveguide 204 at the second multiplexing part 206. Here, as illustrated in and understood from FIG. 9, the waveguide width of the second portion 2042 of the multiplexing optical waveguide 204, which is arranged close to the second multiplexing part 206, may be 7.15 µm so that the effective refractive index of the light beam with the wavelength $\lambda 2'$ in the second order mode can be equal to the effective refractive index of the light beam with the wavelength $\lambda 2'$ in the 0-th order mode. If the inter-waveguide gap is 2.5 µm, the coupling length is 2380 µm. Also, as illustrated in FIG. 9, the light beams with the wavelengths $\lambda 1$, $\lambda 2$, and $\lambda 3$ in the 0-th order mode and the light beam with the wavelength $\lambda 1'$ in the second order mode propagating through the multiplexing optical waveguide 204 are hardly coupled to the second optical waveguide 202 since their effective refractive indexes are greatly different.

Lastly, the light beam with the wavelength $\lambda 3'$ in the 0-th order mode propagating through the third optical waveguide 203 undergoes waveguide mode conversion into the second order mode and is coupled to the multiplexing optical waveguide 204 at the third multiplexing part 207. Here, as illustrated in and understood from FIG. 9, the waveguide width of the third portion 2043 of the multiplexing optical waveguide 204, which is arranged close to the third multiplexing part 207, may be 8.00 μm so that the effective refractive index of the light beam with the wavelength λ3' in the second order mode can be equal to the effective refractive index of the light beam with the wavelength λ3' in the 0-th order mode. If the inter-waveguide gap is 2.5 μm, the coupling length is 900 μm. Also, as illustrated in FIG. 9, the light beams with the wavelengths λ1, λ2, and λ3 in the 0-th order mode and the light beams with the wavelengths λ1' and λ2' in the second order mode propagating through the multiplexing optical waveguide 204 are hardly coupled to the third optical waveguide 203 since their effective refractive indexes are greatly different.

As described above, the light beams with the wavelengths λ1', λ2', and λ3' are converted into second order mode light beams and coupled to the multiplexing optical waveguide 204 to thereby be multiplexed with the light beams with the wavelengths λ1, λ2, and λ3 propagating through the multiplexing optical waveguide 204. As a result, the multiplexed light beam can be output from the output waveguide 208. Also, a multiplexed light beam with a desired spot diameter can be output as the multiplexed light beam by changing the waveguide width of the third portion 2043 of the multiplexing optical waveguide 204 to a desired waveguide width. In particular, a multiplexed light beam with a small spot diameter can be output by changing the waveguide width to a small waveguide width. In this case, the waveguide width should be changed so as to avoid cutoff of the higher order mode light beam. In this embodiment 2, the waveguide width of the output waveguide 208 needs to be not smaller than 5.8 μm, which is the minimum waveguide width allowing propagation of the light beam with the wavelength λ3' in the second order mode.

Figure 10:
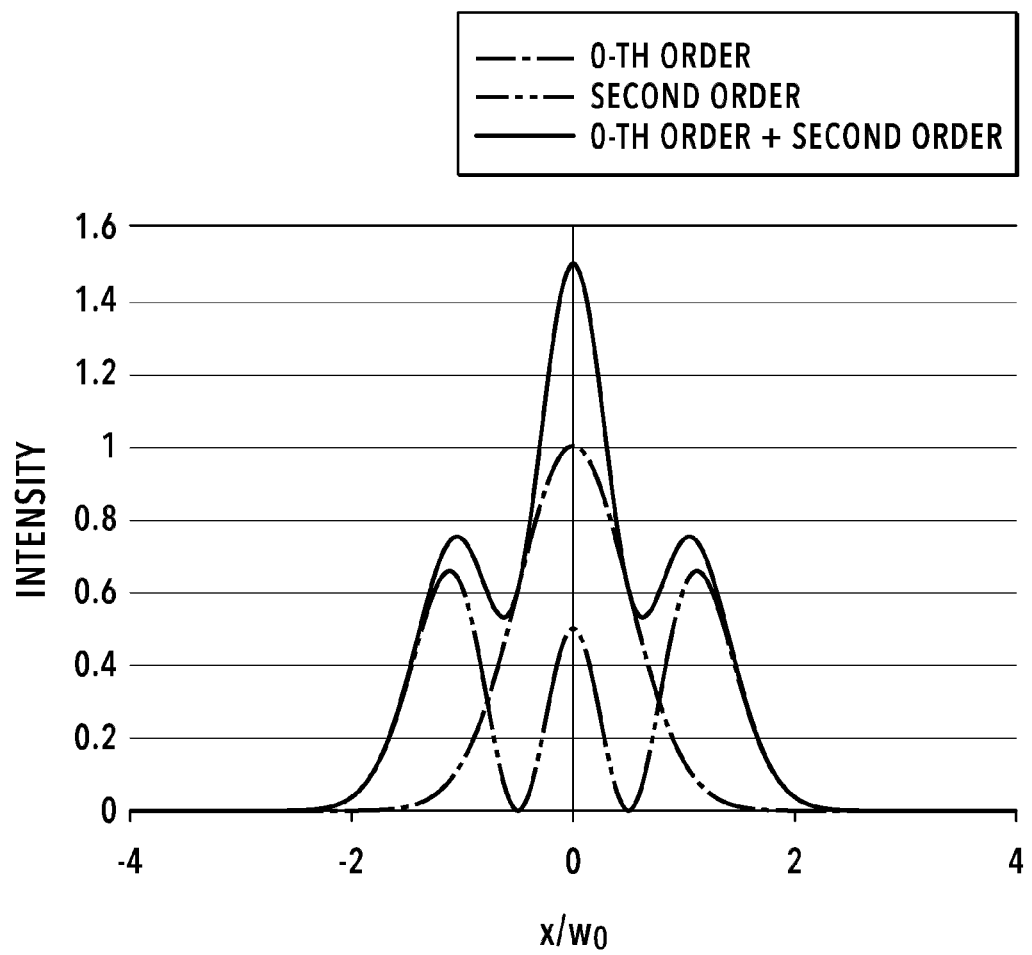
FIG. 10 illustrates the beam profiles of a 0-th order mode light beam, a second order mode light beam, and a multiplexed light beam of the 0-th order mode light beam and the second order mode light beam.

FIG. 10 illustrates the beam profiles of a 0-th order mode light beam, a second order mode light beam, and a multiplexed light beam of the 0-th order mode light beam and the second order mode light beam. With w0 as the spot size and p as the order of the mode, an amplitude E(p)(x) of the light beam in each mode can be approximately expressed by the functions below.

[Math. 1]

$$E(p)(x) = \frac{1}{\left(2pp!w_0\sqrt{\frac{\pi}{2}}\right)^{\frac{1}{2}}} \cdot Hp\left(\frac{x\sqrt{2}}{w_0}\right)e^{-\left(\frac{x}{w_0}\right)^2} \quad \text{(Equation 3)}$$

$$H_0(x) = 1, \quad \text{(Equation 4)}$$
$$H_1(x) = 2x,$$
$$H_2(x) = 4x^2 - 2,$$
$$H_3(x) = 8x^3 - 12x$$

The multiplexed beam profile can be rendered into a profile close to a Gaussian profile by adjusting the intensity of the light beam in each mode. As illustrated in and understood from FIG. 10, the multiplexed light beam of the 0-th order mode light beam and the second order mode light beam has higher intensity and a smaller spot diameter than the 0-th order mode light beam and the second order mode light beam. Thus, with the optical multiplexing circuit according to this embodiment 2, a multiplexed light beam with higher intensity and a smaller spot diameter can be output by multiplexing, in a waveguide in which light beams with R, G, and B wavelengths in the 0-th order mode are multiplexed, light beams with the R, G, and B wavelengths in a different waveguide mode and emitting them.

In this embodiment 2, the description has been given of the example where 0-th order mode light beams and second order mode light beams are multiplexed. However, according to this embodiment 2, multiplexing is possible regardless of the waveguide mode by adjusting the effective refractive index. By allocating different waveguide modes to the set of wavelengths λ1, λ2, and λ3, light beams with this set of wavelengths can be multiplexed as many as the number of waveguide modes to be used. For example, four sets of red, green, and blue light beams can be multiplexed and emitted by using light beams in the 0-th to third order waveguide modes.

Although λ1=450 nm (blue), λ2=520 nm (green), and λ3=650 nm (red) in this embodiment 2, the wavelengths are not limited to these. The light beams with the wavelength λ1, λ2, and λ3 can be light beams with wavelengths in blue (400 to 495 nm), green (495 to 570 nm), and red (620 to 750 nm) wavelength bands, respectively.

Embodiment 3

An optical multiplexing circuit according to embodiment 3 of the present invention will be specifically described with reference to FIG. 11. In this embodiment 3, an optical multiplexing circuit will be discussed which has a function of coupling and multiplexing only light beams with desired wavelengths as in embodiment 1 and a function of multiplexing light beams with wavelengths in different waveguide modes to thereby output a multiplexed light beam with higher intensity as in embodiment 2.

Figure 11:
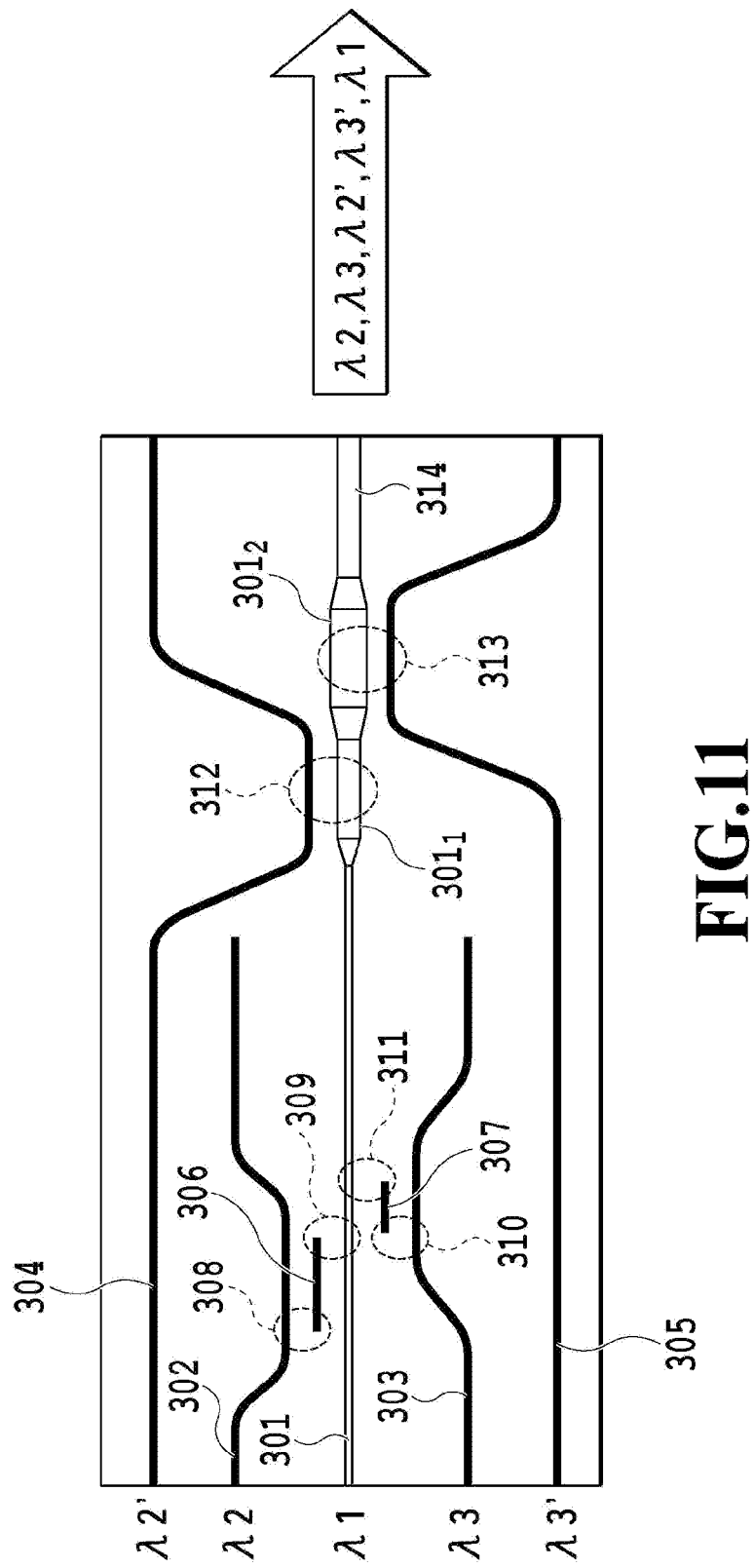
FIG. 11 exemplarily illustrates an optical multiplexing circuit according to embodiment 3 of the present invention.

FIG. 11 illustrates an optical multiplexing circuit including first to fifth optical waveguides 301 to 305 into which light beams with wavelengths λ1, λ2, λ3, λ2' and λ3' are input, respectively, first and second MM conversion waveguides 306 and 307, first to fourth coupling parts 308 to 311, first and second multiplexing parts 312 and 313, and an output waveguide 314 coupled to the first optical waveguide 301.

The first to fifth optical waveguides 301 to 305 and the first and second MM conversion waveguides 306 and 307 are formed of a lower cladding layer provided on a substrate, a core layer higher in refractive index than the lower cladding layer, and an upper cladding layer provided on the core layer. The upper cladding layer is provided so as to surround the core layer. The first optical waveguide 301 can be a multi-mode waveguide. The second to fifth optical waveguides 302 to 305 can be single-mode waveguides. As illustrated in FIG. 11, the first to fifth optical waveguides 301 to 305 and the first and second MM conversion waveguides 306 and 307 are arranged side by side along the light travel direction. The first optical waveguide 301 includes first and second portions 301$_1$ and 301$_2$ differing from each other in waveguide width. The first and second portions 301$_1$ and 301$_2$ and the output waveguide 315 are each coupled to another by a tapered waveguide.

In this embodiment 3, the first to fifth optical waveguides 301 to 305 and the first and second MM conversion waveguides 306 and 307 differ from each other in waveguide width. The first to fourth coupling parts 308 to 311 are directional couplers formed by arranging the second optical waveguide 302 and the first MM conversion waveguide 306 close to each other, arranging the first optical waveguide 301 and the first MM conversion waveguide 306 close to each other, arranging the third optical waveguide 303 and the second MM conversion waveguide 307 to each other, and arranging the first optical waveguide 301 and the second MM conversion waveguide 307 to each other, respectively. The first and second multiplexing parts 312 and 313 are directional couplers formed by arranging the fourth optical waveguide 304 and the first optical waveguide 301 close to each other and arranging the fifth optical waveguide 305 and the first optical waveguide 301 close to each other, respectively.

As in embodiment 1, the waveguide widths of the first and second optical waveguides 301 and 302 and the waveguide width of the first MM conversion waveguide 306 are set such that the effective refractive index of the second optical waveguide 302 with the light beam with the wavelength $\lambda 2$ in the 0-th order mode is equal to the effective refractive index of the first MM conversion waveguide 306 with the light beam with the wavelength $\lambda 2$ in a higher order mode and that the effective refractive index of the first optical waveguide 301 with the light beam with the wavelength $\lambda 1$ in the 0-th order mode is not equal to the effective refractive index of the first MM conversion waveguide 306 with each light beam with the wavelength $\lambda 1$ in the higher order mode. Also, the waveguide widths of the first and third optical waveguides 301 and 303 and the waveguide width of the second MM conversion waveguide 307 are set such that the effective refractive index of the third optical waveguide 303 with the light beam with the wavelength $\lambda 3$ in the 0-th order mode is equal to the effective refractive index of the second MM conversion waveguide 307 with the light beam with the wavelength $\lambda 3$ in the higher order mode and that the effective refractive index of the first optical waveguide 301 with the light beam with the wavelength $\lambda 1$ in the 0-th order mode is not equal to the effective refractive index of the second MM conversion waveguide 307 with each of the light beams with the wavelengths $\lambda 1$ and $\lambda 2$.

Further, as in this embodiment 2, the waveguide width of the first portion $301_1$ is set such that the effective refractive index of the fourth optical waveguide 304 with the light beam with the wavelength $\lambda 2'$ in the 0-th order mode is equal to the effective refractive index of the first portion $301_1$ of the first optical waveguide 301 with the light beam with the wavelength $\lambda 2'$ in a higher order mode and that the effective refractive indexes of the first portion $301_1$ of the first optical waveguide 301 with the light beams with the wavelengths $\lambda 1$, $\lambda 2$, and $\lambda 3$ in the higher order mode are not equal to the effective refractive indexes of the fourth optical waveguide 304 with the light beams with the wavelengths $\lambda 1$, $\lambda 2$, and $\lambda 3$ in the 0-th order mode. Also, the waveguide width of the second portion $301_2$ is set such that the effective refractive index of the fifth optical waveguide 305 with the light beam with the wavelength $\lambda 3'$ in the 0-th order mode is equal to the effective refractive index of the second portion $301_2$ of the first optical waveguide 301 with the light beam with the wavelength $\lambda 3'$ in the higher order mode and that the effective refractive indexes of the second portion $301_2$ of the first optical waveguide 301 with the light beams with the wavelengths $\lambda 1$, $\lambda 2$, and $\lambda 3$ in the higher order mode are not equal to the effective refractive indexes of the fifth optical waveguide 305 with the light beams with the wavelengths $\lambda 1$, $\lambda 2$, and $\lambda 3$ in the 0-th order mode.

This embodiment 3 assumes that the light beams with the wavelengths $\lambda 1$, $\lambda 2$, and $\lambda 3$ are light beams with wavelengths in blue (400 to 495 nm), green (495 to 570 nm), and red (620 to 750 nm) wavelength bands, respectively, $\lambda 2'= (\lambda 2+\beta)$ nm (green), $\lambda 3'=(\lambda 3+\gamma)$ nm (red), and $\beta$ and $\gamma$ are small values larger than 0 and smaller than the linewidth. The linewidth is dependent on the light source of the incoming light beam but is assumed to be about 1 nm or smaller.

The operation of the optical multiplexing circuit according to embodiment 3 of the present invention will be described below. The light beam with the wavelength $\lambda 2$ having input to the second optical waveguide 302 undergoes waveguide mode conversion into the first order mode and transfers to the first MM conversion waveguide 306 at the first coupling part 308, and further undergoes waveguide mode conversion into the 0-th order mode and transfers to the first optical waveguide 301 at the second coupling part 309. Similarly, the light beam with the wavelength $\lambda 3$ having input to the third optical waveguide 303 undergoes waveguide mode conversion into the first order mode and transfers to the second MM conversion waveguide 307 at the third coupling part 310, and further undergoes waveguide mode conversion into the 0-th order mode and transfers to the first optical waveguide 301 at the fourth coupling part 311.

Also, as in embodiment 1, the second and fourth coupling parts 309 and 311 are designed so as not to satisfy conditions for coupling to the first and second MM conversion waveguides 306 and 307. Thus, the light beam with the wavelength $\lambda 1$ in the 0-th order mode having input to the first optical waveguide 301 does not transfer to either of the first and second MM conversion waveguides 306 and 307 at the respective second and fourth coupling parts 309 and 311 but is transmitted by the second and fourth coupling parts 309 and 311. As a result, the light beam with the wavelength $\lambda 1$ transmitted by the second and fourth coupling parts 309 and 311 and the light beams with the wavelengths $\lambda 2$ and $\lambda 3$ having transferred from the second and third optical waveguides 302 and 303 through the first and second MM conversion waveguides 306 and 307, respectively, are multiplexed and input into the first portion $301_1$ of the first optical waveguide 301. In this way, the optical multiplexing circuit according to embodiment 3 can implement the function of coupling and multiplexing only light beams with desired wavelengths as in embodiment 1.

On the other hand, the light beam with the wavelength $\lambda 2'$ in the 0-th order mode propagating through the fourth optical waveguide 304 undergoes waveguide mode conversion into the second order mode and is coupled to the first portion $301_1$ of the first optical waveguide 301 at the first multiplexing part 312. The coupled light beam with the wavelength $\lambda 2'$ in the second order mode is multiplexed with the light beams with the wavelengths $\lambda 1$, $\lambda 2$, and $\lambda 3$ in the 0-th order mode propagating through the first portion $301_1$ of the first optical waveguide 301 and input into the second portion $301_2$ of the first optical waveguide 301. Further, the light beam with the wavelength $\lambda 3'$ in the 0-th order mode propagating through the fifth optical waveguide 305 undergoes waveguide mode conversion into the second order mode and is coupled to the second portion $301_2$ of the first optical waveguide 301 at the second multiplexing part 313. The coupled light beam with the wavelength $\lambda 3'$ in the second order mode is multiplexed with the multiplexed light beam propagating through the second portion $301_2$ of the first optical waveguide 301 and output from the output waveguide 314. In this way, the optical multiplexing circuit according to embodiment 3 can implement the function of multiplexing light beams with wavelengths in different waveguide modes to thereby output a multiplexed light beam with higher intensity as in embodiment 2.

Assume for example that, in the optical multiplexing circuit according to embodiment 3, $\lambda 1 =450$ nm, $\lambda 2=520$ nm, λ3=650 nm, the waveguide thickness is 3.6 µm, the relative refractive index difference Δ is 0.45%, the inter-waveguide gaps at the first to fourth coupling parts 308 to 311 and between the fourth optical waveguide 304 and the first portion 301$_1$ and between the fifth optical waveguide 305 and the second portion 301$_2$ are 2.5 µm, the coupling lengths at the first to fourth coupling parts 308 to 311 are 702 µm, the coupling length at the first multiplexing part 312 is 2380 µm, the coupling length at the second multiplexing part 313 900 µm, and the waveguide widths of the first to fifth optical waveguides 301 to 305 are 1.5 µm, as in embodiments 1 and 2. In this case, it is possible to make the optical multiplexing circuit according to embodiment 3 by setting the waveguide width of the first MM conversion waveguide 306 to 4.3 µm, the waveguide width of the second MM conversion waveguide 307 to 4.8 µm, the waveguide width of the first portion 301$_1$ to 7.15 µm, and the waveguide width of the second portion 301$_2$ to 8.00 µm based on FIGS. 5 and 9.

Here, in the above embodiments, the description has been given of the cases of using directional couplers as the coupling parts. It is, however, needless to say that, for example, a 2×1 MMI or different multiplexer may be used instead. Also, in the above embodiments, RGB coupler modules have been exemplarily described. It is, however, needless to say that the present invention is applicable to cases of multiplexing a plurality of light beams with a plurality of wavelengths in a single waveguide, regardless of the materials and the relative refractive index difference Δ. Further, the waveguide shape according to the present invention is not dependent on the material of the planar waveguide and the relative refractive index difference Δ and is therefore applicable to planar waveguides in general. Furthermore, in the above embodiments, optical multiplexing circuits for R, G, and B, which are three primary colors of visible light, have been exemplarily discussed. It is, however, obvious that the present invention is applicable as an optical multiplexing/demultiplexing circuit that multiplexes or demultiplexes a plurality of light beams with different wavelengths.

The invention claimed is:

1. An optical multiplexing circuit comprising:
    a first optical waveguide, wherein a first light beam with a first wavelength in a 0-th order mode is input into the first optical waveguide;
    one or more second waveguides, wherein one or more second light beams in the 0-th order mode are input into the one or more second waveguides, wherein wavelengths of the one or more second light beams are different from the first wavelength and different from each other;
    a multi-mode conversion waveguide provided between the first optical waveguide and each the one or more second waveguides;
    a first coupling part provided between each of the one or more second waveguides and the multi-mode conversion waveguide, with a first inter-waveguide gap for converting a waveguide mode of each the one or more second light beams propagating through each of the one or more second waveguides into a higher order mode to couple each of the one or more second light beams converted into the higher order mode to the multi-mode conversion waveguide;
    a second coupling part provided between the multi-mode conversion waveguide and the first optical waveguide, with a second inter-waveguide gap for converting a waveguide mode of each of the one or more second light beams propagating through the multi-mode conversion waveguide into the 0-th order mode to couple each of the one or more second light beams converted into the 0-th order mode to the first optical waveguide, wherein the first light beam propagates through the first optical waveguide,
    wherein waveguide widths of the first optical waveguide, the one or more second waveguides, and the multi-mode conversion waveguide are set such that:
        an effective refractive index of each of the one or more second waveguides with each of the one or more second light beams converted into the 0-th order mode is equal to an effective refractive index of the multi-mode conversion waveguide with each of the one or more second light beams converted into the higher order mode; and
        an effective refractive index of the multi-mode conversion waveguide with the first light beam in the higher order mode is not equal to an effective refractive index of each of the one or more second waveguides with the first light beam in the 0-th order mode; and
    wherein the multi-mode conversion waveguide has a transfer area shared by the first coupling part and the second coupling part.

2. The optical multiplexing circuit according to claim 1, wherein the first optical waveguide is a multi-mode waveguide and the one or more second waveguides are single-mode waveguides.

3. The optical multiplexing circuit according to claim 1, wherein:
    the first optical waveguide includes a multiplexing part
    waveguide widths of the multiplexing part are different from that of another part except for the multiplexing part; and
    waveguide widths of the multiplexing part of the first optical waveguide and the one or more second waveguides are set such that an effective refractive index of each of the one or more second waveguides with each the second light beam in the 0-th order mode is equal to an effective refractive index of the multiplexing part of the first optical waveguide with each the one or more second light beams in the higher order mode and such that an effective refractive index of the multiplexing part of the first optical waveguide with the first light beam in the higher order mode is not equal to an effective refractive index of each the one or more second waveguides with the first light beam in the 0-th order mode.

4. The optical multiplexing circuit according to claim 1, wherein the multiplexed light beams include at least one wavelength from each of wavelength bands of 400 to 495 nm, 495 to 570 nm, and 620 to 750 nm.

5. An optical multiplexing circuit comprising:
    a first optical waveguide configured to receive a first light beam having a first wavelength in a 0-th order mode;
    a second optical waveguide configured to receive a second light beam, wherein a second wavelength of the second light beam is different from the first wavelength;
    a multi-mode conversion waveguide provided between the first optical waveguide and the second waveguide, the multi-mode conversion waveguide including a first coupling part and a second coupling part;
    wherein a first inter-wave gap is provided between the second waveguide and the first coupling part,
    wherein the first coupling part, the second waveguide and the first inter-wave gap are arranged to convert a waveguide mode of the second light beam propagating through the second waveguide into a higher order mode to couple the second light beam that has been converted into the higher order mode to the multi-mode conversion waveguide;

wherein a second inter-wave gap is provided between the second coupling part and the first optical waveguide, wherein the second coupling part, the first optical waveguide and the second inter-wave gap are arranged to convert a waveguide mode the second light beam propagating through the multi-mode conversion waveguide into the 0-th order mode to couple the second light beam converted into the 0-th order mode to the first optical waveguide, wherein the first light beam propagates through the first optical waveguide, wherein waveguide widths of the first optical waveguide, the second waveguide and the multi-mode conversion waveguide are set such that:
- an effective refractive index of the second optical waveguide with the second light beam converted into the 0-th order mode is equal to an effective refractive index of the multi-mode conversion waveguide with the second light beam converted into the higher order mode; and
- an effective refractive index of the multi-mode conversion waveguide with the first light beam in the higher order mode is not equal to an effective refractive index of the second optical waveguide with the first light beam in the 0-th order mode; and wherein the multi-mode conversion waveguide has a transfer area shared by the first coupling part and the second coupling part.

\* \* \* \* \*